US012752920B2

(12) # United States Patent
Reese

(10) Patent No.: US 12,752,920 B2
(45) Date of Patent: Oct. 6, 2026

(54) MAGNETIC ACCESS PANEL

(71) Applicant: Textron Innovations Inc., Providence, RI (US)

(72) Inventor: Matthew William Reese, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 378 days.

(21) Appl. No.: 18/461,927

(22) Filed: Sep. 6, 2023

(65) Prior Publication Data

US 2025/0074599 A1 Mar. 6, 2025

(51) Int. Cl.

| | |
|---|---|
| ***B64D 11/06*** | (2006.01) |
| *G09F 7/04* | (2006.01) |
| *G09F 21/04* | (2006.01) |
| *G09F 23/00* | (2006.01) |

(52) U.S. Cl.

CPC ............ *B64D 11/0646* (2014.12); *G09F 7/04* (2013.01); *G09F 21/041* (2020.05); *G09F 23/00* (2013.01); *G09F 2023/005* (2013.01)

(58) Field of Classification Search

CPC .... G09F 2023/005; G09F 21/041; G09F 7/04; G09F 2007/1852; G09F 23/00; B64D 11/0646

See application file for complete search history.

(56) References Cited

U.S. PATENT DOCUMENTS 1,672,183 A * 6/1928 Wadsworth .......... G04B 39/002 368/295
2005/0278999 A1* 12/2005 Chiang ..................... G09F 7/04 40/575

FOREIGN PATENT DOCUMENTS

KR 20170003376 U * 9/2017 ............... A47C 1/11

* cited by examiner

*Primary Examiner* — Syed A Islam
(74) *Attorney, Agent, or Firm* — Slater Matsil, LLP

(57) ABSTRACT

A passenger seat comprising a first armrest assembly; a second armrest assembly, the second armrest assembly comprising: a side panel comprising an armrest portion and a side portion, the side panel comprising a first magnet secured on an interior side of the side panel; an interior compartment disposed within the side panel; and an access panel in a removably attached position to the side panel, the access panel comprising a second magnet secured on an interior side of the access panel, the first magnet being aligned with the second magnet when the access panel is in the removably attached position.

20 Claims, 16 Drawing Sheets

MAGNETIC ACCESS PANEL

TECHNICAL FIELD

The disclosed embodiments relate generally to a system and method of use relating to an access panel in a passenger seat, and, in particular embodiments, to a system and method of use relating to a magnetic access panel within an armrest assembly of a passenger seat of a transportation vessel such as an aircraft.

BACKGROUND

In passenger travel, such as private and commercial aviation, passenger comfort and convenience are important factors in determining the overall travel experience. In particular, passenger seats may be designed to include a variety of amenities that benefit a passenger's overall experience. Many of these amenities require electronics or electric connections, which may eventually undergo repair, maintenance, and/or replacement of parts. Passenger seats may include interior compartments to house these features within armrest assemblies, and accessing the interior compartments without dismantling the passenger seats (or armrest assemblies) improves the efficiency of performing repairs, maintenance, and/or replacement of parts.

SUMMARY

In accordance with an embodiment of the present invention, a passenger seat comprises a first armrest assembly; a second armrest assembly, the second armrest assembly comprising: a side panel comprising an armrest portion and a side portion, the side panel comprising a first magnet secured on an interior side of the side panel; an interior compartment disposed within the side panel; and an access panel in a removably attached position to the side panel, the access panel comprising a second magnet secured on an interior side of the access panel, the first magnet being aligned with the second magnet when the access panel is in the removably attached position.

It is to be understood that both the foregoing general description and the following detailed description are exemplary and explanatory only and are not restrictive of the disclosure, as claimed.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
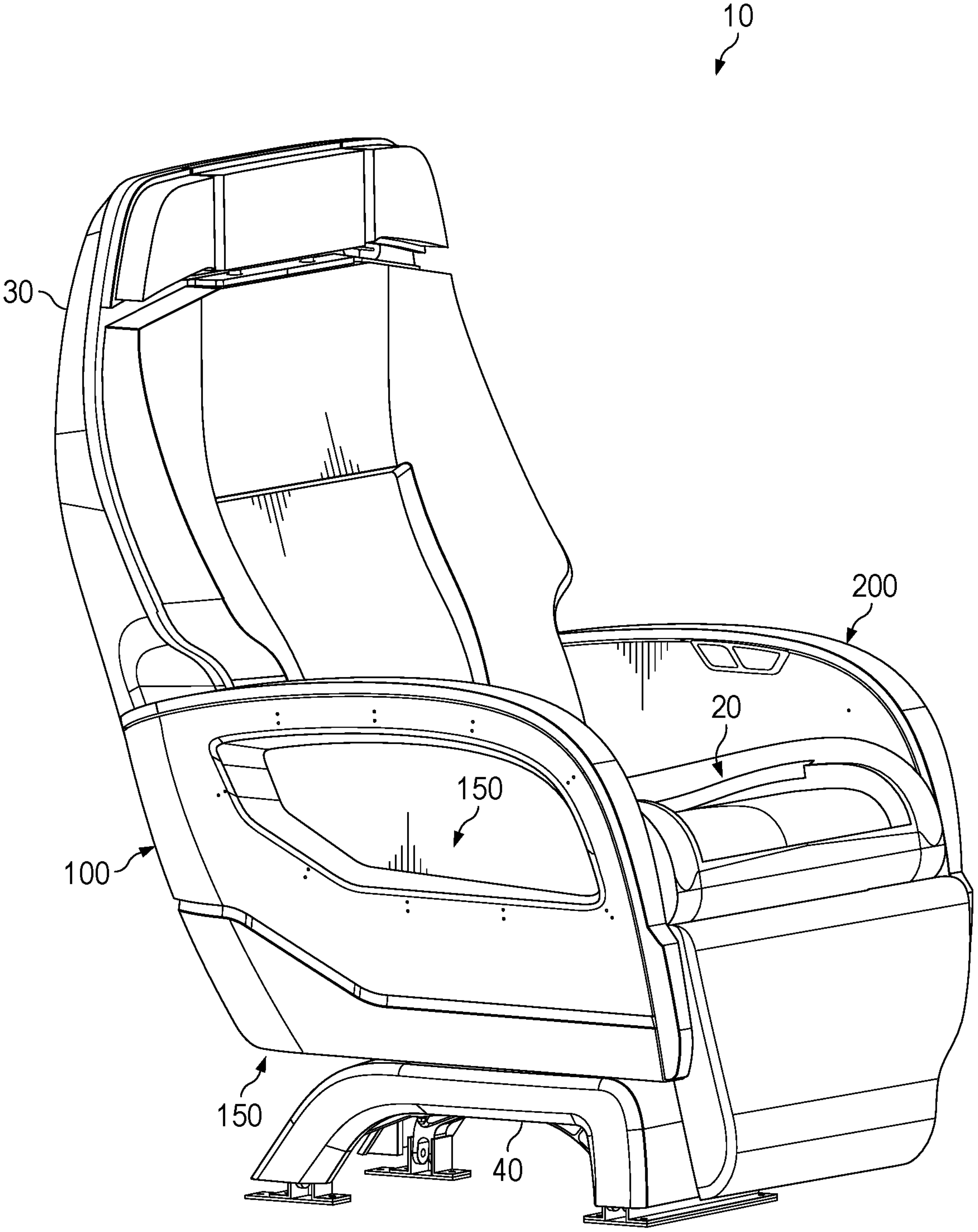
FIG. 1 shows a perspective view of a passenger seat, in accordance with various embodiments.

FIG. 1 shows a passenger seat 10 designed for a transportation vessel such as an airplane or aircraft. As shown, the passenger seat 10 includes a seat 20 (e.g., a seat cushion), a seat back 30, an inboard armrest assembly 100, an outboard armrest assembly 200, and a seat base 40. For the convenience of discussion, in the illustrated embodiments, the passenger seat 10 faces forward, the seat back 30 is aft, the inboard armrest assembly 100 is along the right side of a sitting passenger, and the outboard armrest assembly 200 is along the left side of the sitting passenger. Note that the reverse or mirrored layout may apply with respect to the inboard and outboard armrest assemblies 100, 200 depending on location within the passenger vessel (e.g., depending on a side of an aisle, proximity to port or starboard sides of the aircraft, and/or a direction of pointing). The passenger may sit on the seat 20 and lean against the seat back 30. The inboard armrest assembly 100 and the outboard armrest assembly 200 provide lateral structure to the passenger seat 10 and the passenger sitting in the passenger seat 10. The seat base 40 secures the passenger seat 10, for example, to a cabin floor of the aircraft.

The terms inboard and outboard may be understood in reference to a passenger seat 10 (e.g., in a standard position) having one lateral side facing toward an aircraft wall (e.g., outboard) and the other lateral or opposing side facing an aisle or interior of the aircraft (e.g., inboard). As discussed in greater detail below, the inboard armrest assembly 100 and the outboard armrest assembly 200 may be asymmetrical in connection with their respective features. However, some features described in connection with the inboard armrest assembly 100 may be applicable to the outboard armrest assembly 200, and vice versa, in accordance with various embodiments. In addition, in some embodiments, the inboard armrest assembly 100 and the outboard armrest assembly 200 may be symmetrical with respect to one another.

As discussed in greater detail below, an interior region of the inboard armrest assembly 100 may include an inboard interior compartment 150, and an interior region of the outboard armrest assembly 200 may include an outboard interior compartment 250 (see FIGS. 7-10). For example, the interior compartments 150, 250 may house various electronics utilized for the functionality of the passenger seat 10 and/or to the benefit of an occupant of the passenger seat 10. The interior compartments 150, 250 may be used for other purposes, such as storage. As described in greater detail below, the interior compartments 150, 250 may be accessed through access panels in the inboard and outboard armrest assemblies 100, 200. Note that the passenger seat 10 may include additional components, whether illustrated or not, that may not be specifically described or referenced herein.

Figure 2A:
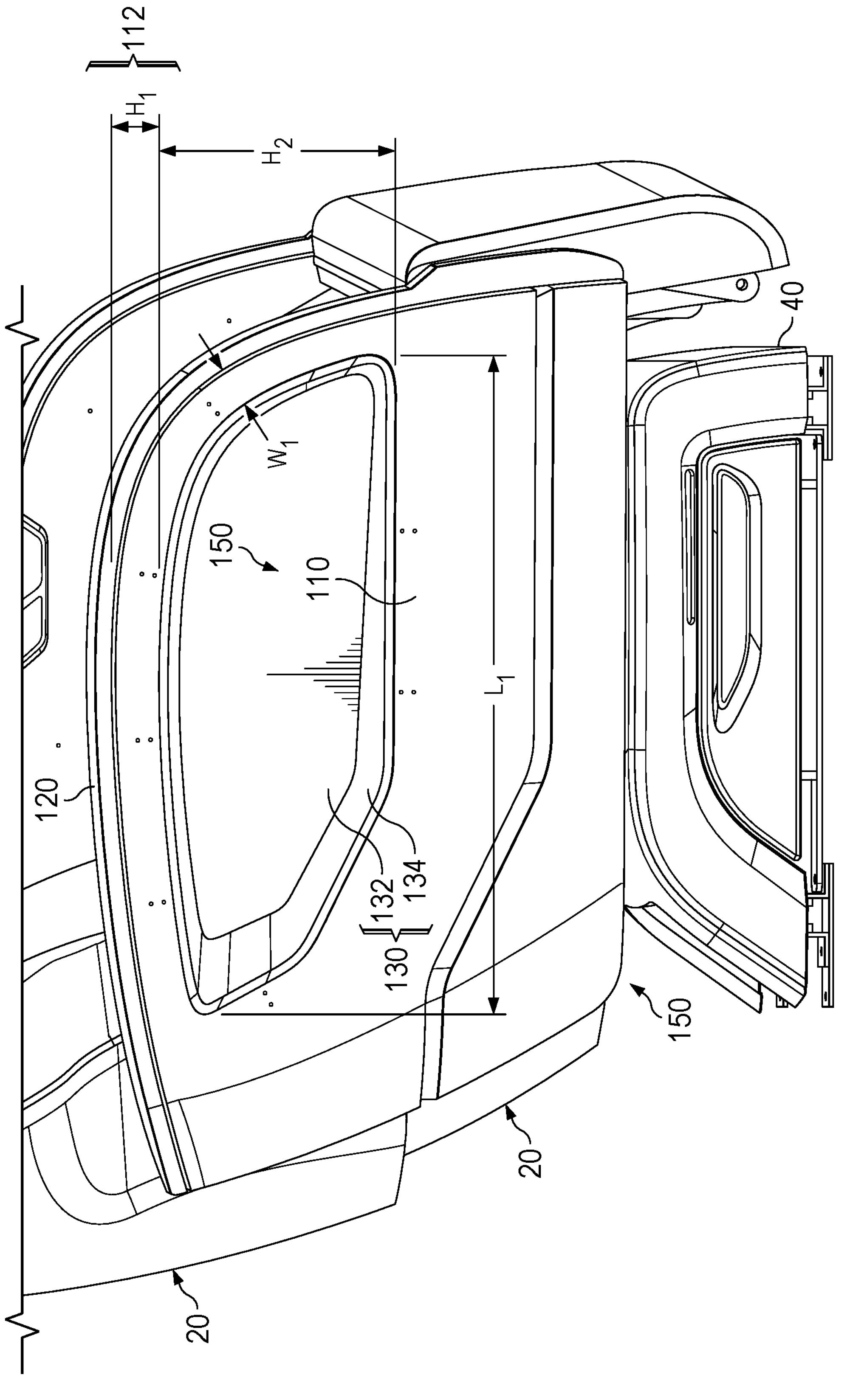
FIGS. 2A and 2B show an inboard side of a passenger seat, in accordance with various embodiments.
Figure 2B:
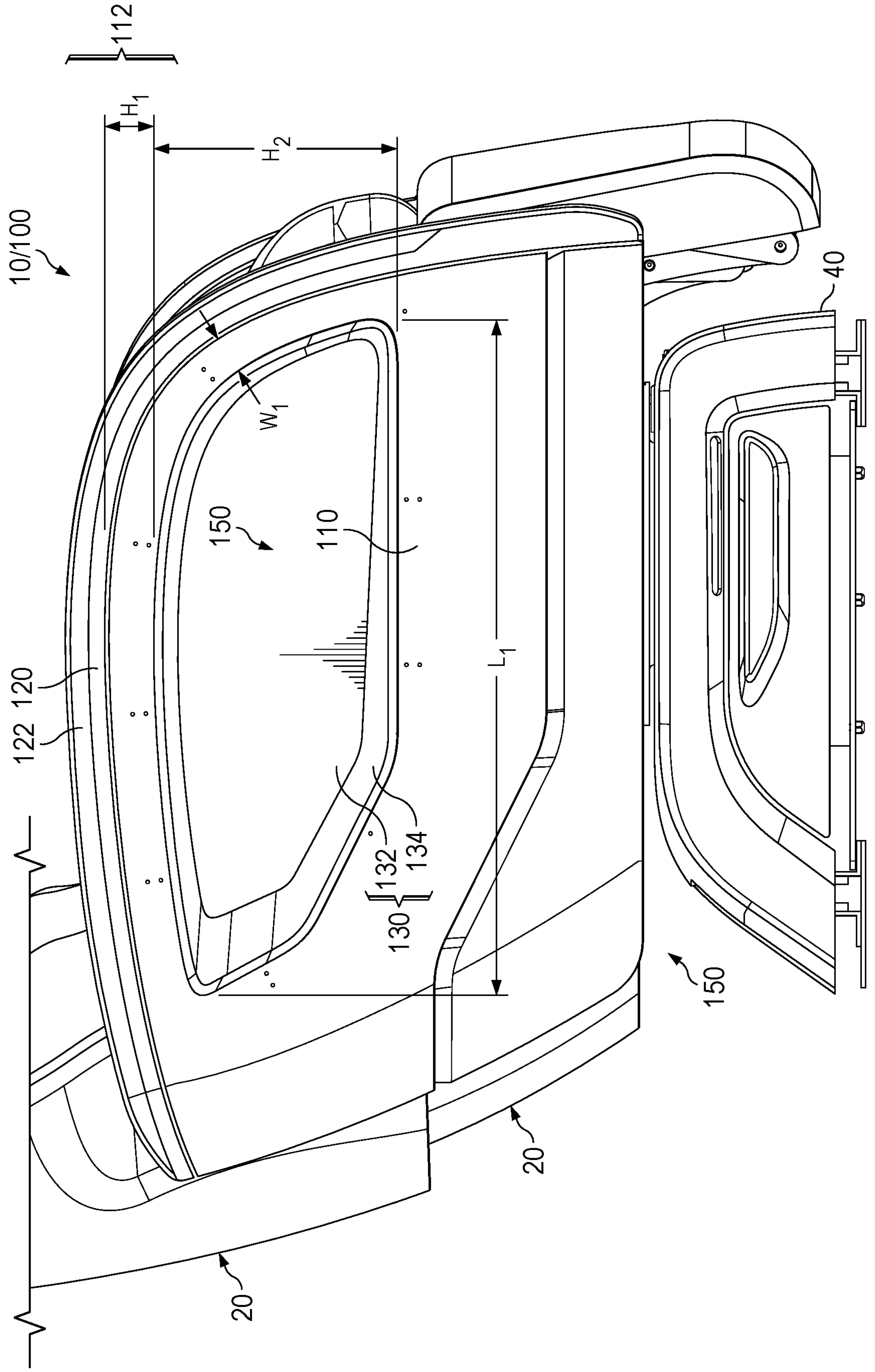
Figure 7:
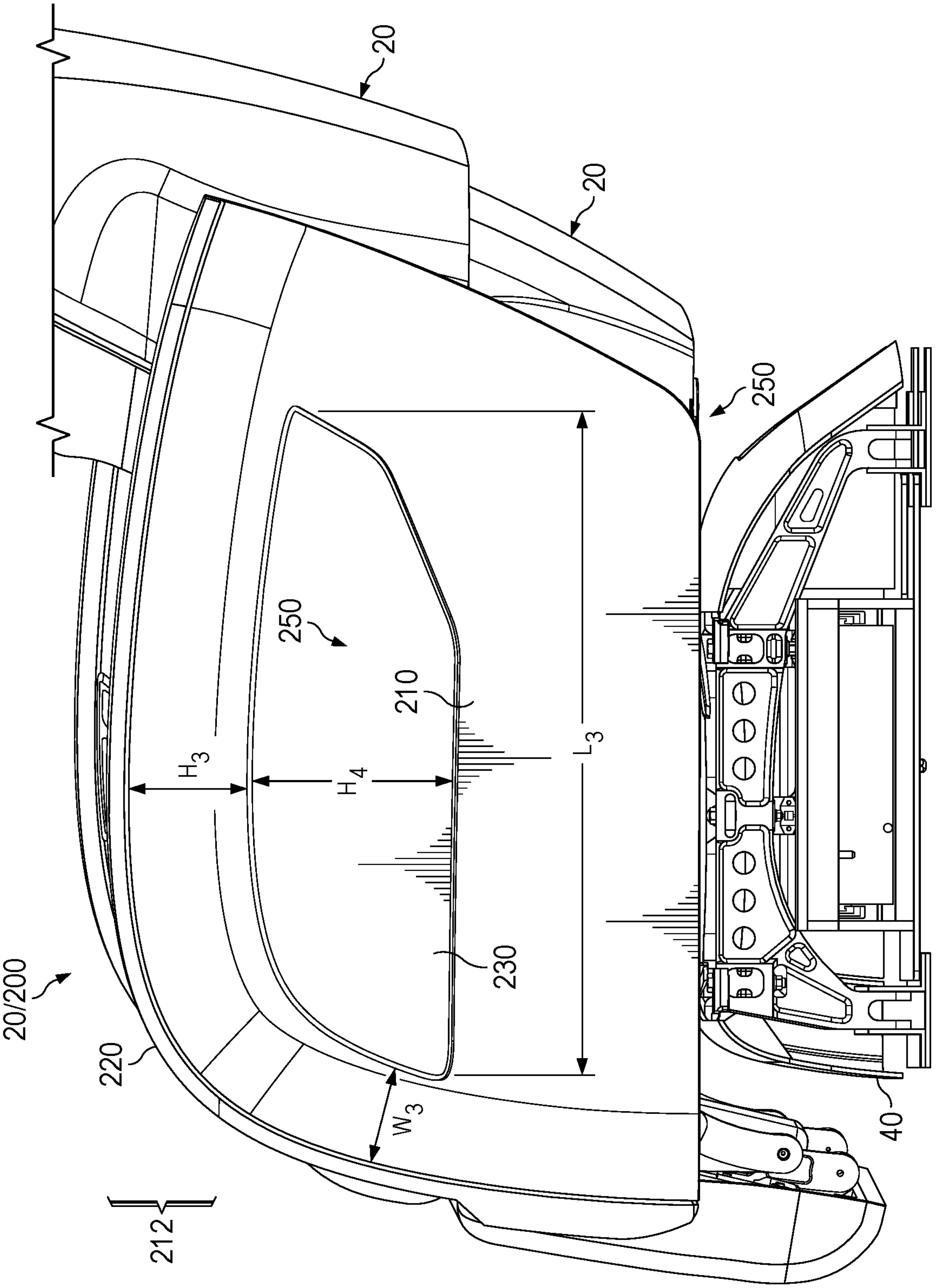
FIG. 7 shows an outboard side of a passenger seat, in accordance with various embodiments.

FIGS. 2A and 2B show an inboard side view of the passenger seat 10 (see FIG. 7 for an outboard side view of the passenger seat 10). In accordance with various embodiments, the inboard armrest assembly 100 includes a side panel 110 (e.g., a primary panel), an armrest cap 120, an access panel 130 (e.g., an inset panel assembly or insert panel assembly), and an inboard interior compartment 150. As illustrated, the side panel 110 provides a lateral outer casing or protective structure for the inboard side of the passenger seat 10. The side panel 110 may comprise one piece or multiple pieces made of plastic, metal (e.g., metal alloy), any other suitable materials, or combinations thereof. In addition, the armrest cap 120 extends over and along outer edges of the side panel 110. The armrest cap 120 provides a location for the passenger to rest or grasp onto the passenger seat 10 for comfort and/or stability. Furthermore, for the benefit of later discussion, the armrest cap 120 and an upper portion of the side panel 110 may collectively be referred to as an armrest portion 112 of the inboard armrest assembly 100.

In various embodiments (not separately illustrated), the side panel 110 is wrapped in a fabric or other textile material, including a cotton, a leather, a leather-like material, other natural or other polysynthetic fabrics, or the like. Referring to FIG. 2B, in some embodiments, the armrest cap 120 may include a covering 122, such as a foam material, a fabric, and/or other cover material. The covering 122 may be a same, similar, or different material than the wrapping around the side panel 110. As such, the covering 122 may set atop or wrap around the armrest cap 120. In other embodiments, the armrest cap 120 remains bare and comprises a foam material, a plastic, or another sturdy material, which may be rigid or have a soft and flexible tactility. In addition, the wrapping around the side panel 110 may be attached to the side panel 110 and tucked under the armrest cap 120.

In some embodiments, the access panel 130 may be an inset to a central region of the side panel 110. The access panel 130 provides a means to access the inboard interior compartment 150 within the inboard armrest assembly 100 in an efficient manner in lieu of dismantling portions of the passenger seat 10 (e.g., the inboard armrest assembly 100). For example, the access panel 130 is removably attached to (e.g., attachable to and detachable from) the side panel 110 without otherwise altering the structure of other components of the inboard armrest assembly 100 or passenger seat 10.

As illustrated, the access panel 130 includes a decorative panel 132 and a bezel rim 134. In accordance with various embodiments, the access panel 130 has a bowl shape such that the bezel rim 134 forms a looped shape which may be circular, oval, substantially rectangular, or any suitable shape (e.g., following contours of portions of the side panel 110, as illustrated). In addition, in the removably attached position, the bezel rim 134 (e.g., wall of the bowl) extends inward from an exterior surface of the side panel 110. The walls of the bezel rim 134 may be concave or convex, however, any suitable shapes or curvatures may be used. In the illustrated embodiments, the walls of the bezel rim 134 are effectively convex due to the respective sloping of a bulk portion and an exterior lip portion of the bezel rim 134 (see FIGS. 4A through 4C). As illustrated, an entirety of the decorative panel 132 may be inset within (or encircled by) outer edges of the bezel rim 134, and the access panel 130 (e.g., the decorative panel 132) is therefore recessed from exterior surfaces of the side panel 110 when the access panel 130 is in the removably attached position.

In some embodiments, the decorative panel 132 has a shape that is concentric to and/or substantially follows the shape of the bezel rim 134. Similarly, the outer edges of the bezel rim 134 may substantially follow contours (e.g., some outer edges) of the side panel 110. For example, top and front edges of the bezel rim 134 may substantially follow top and forward edges of the side panel 110. A height $H_1$ and a width $W_1$ of the side panel 110 above and around the access panel 130 edges may be greater than or equal to about 1 inch for the benefit of structural integrity of the side panel 110 of the inboard armrest assembly 100. However, the outer edge of the bezel rim 134 may be any suitable shape. In addition, the access panel 130 may have a height $H_2$ (e.g., a maximum vertical height) ranging from about 5 inches to about 8 inches (e.g., about 7 inches) and a length $L_1$ (e.g., a maximum horizontal length) ranging from about 8 inches to about 20 inches (e.g., about 19 inches). These dimensions are intended to be large enough to access the inboard interior compartment 150 by hand and/or requisite tools while also allowing other parts of the inboard armrest assembly 100 to provide sufficient structural stability. However, any suitable dimension ranges and shapes of the access panel 130 may be used.

Figure 3A:
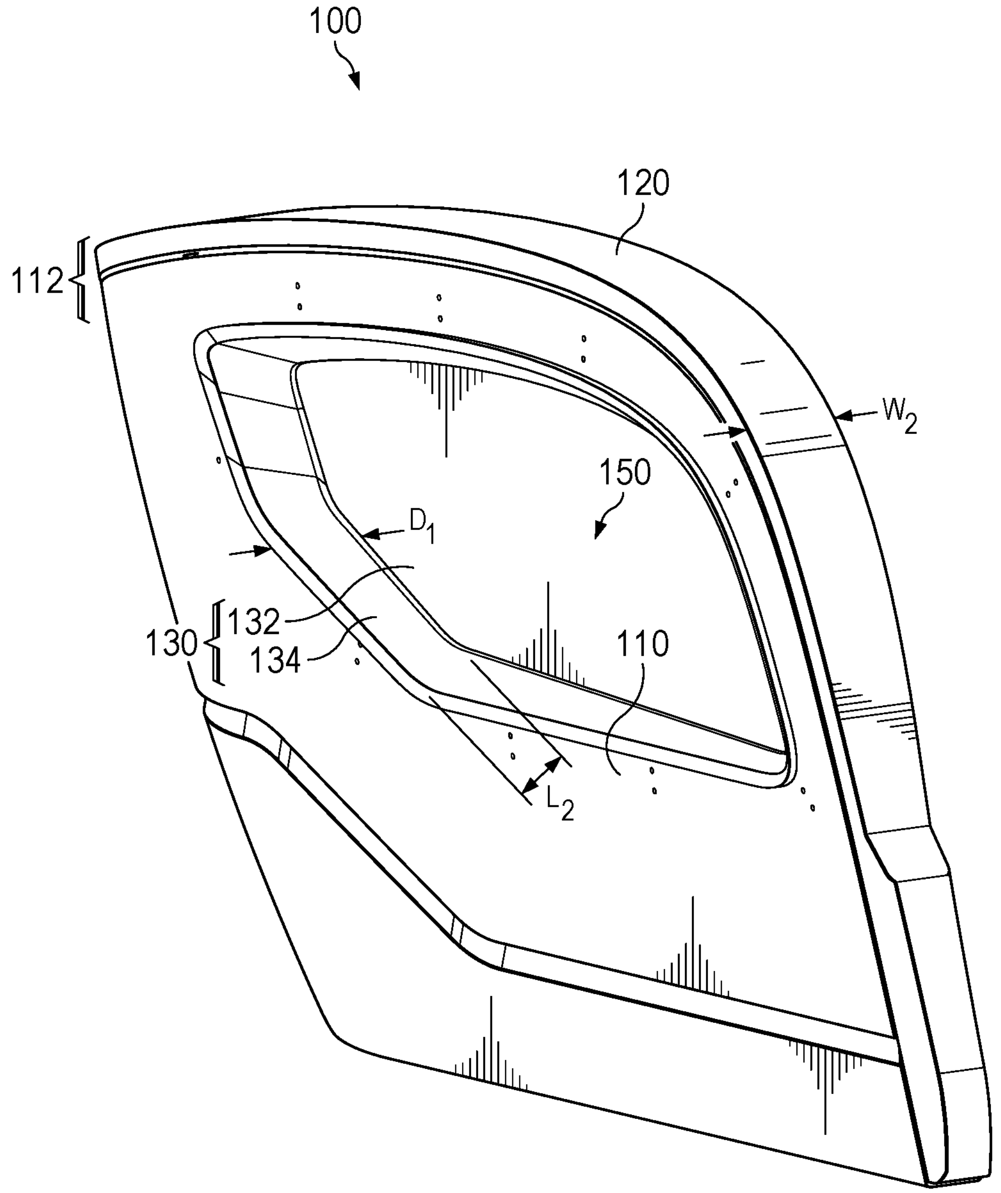
FIGS. 3A and 3B show an inboard armrest assembly of a passenger seat, in accordance with various embodiments.
Figure 3B:
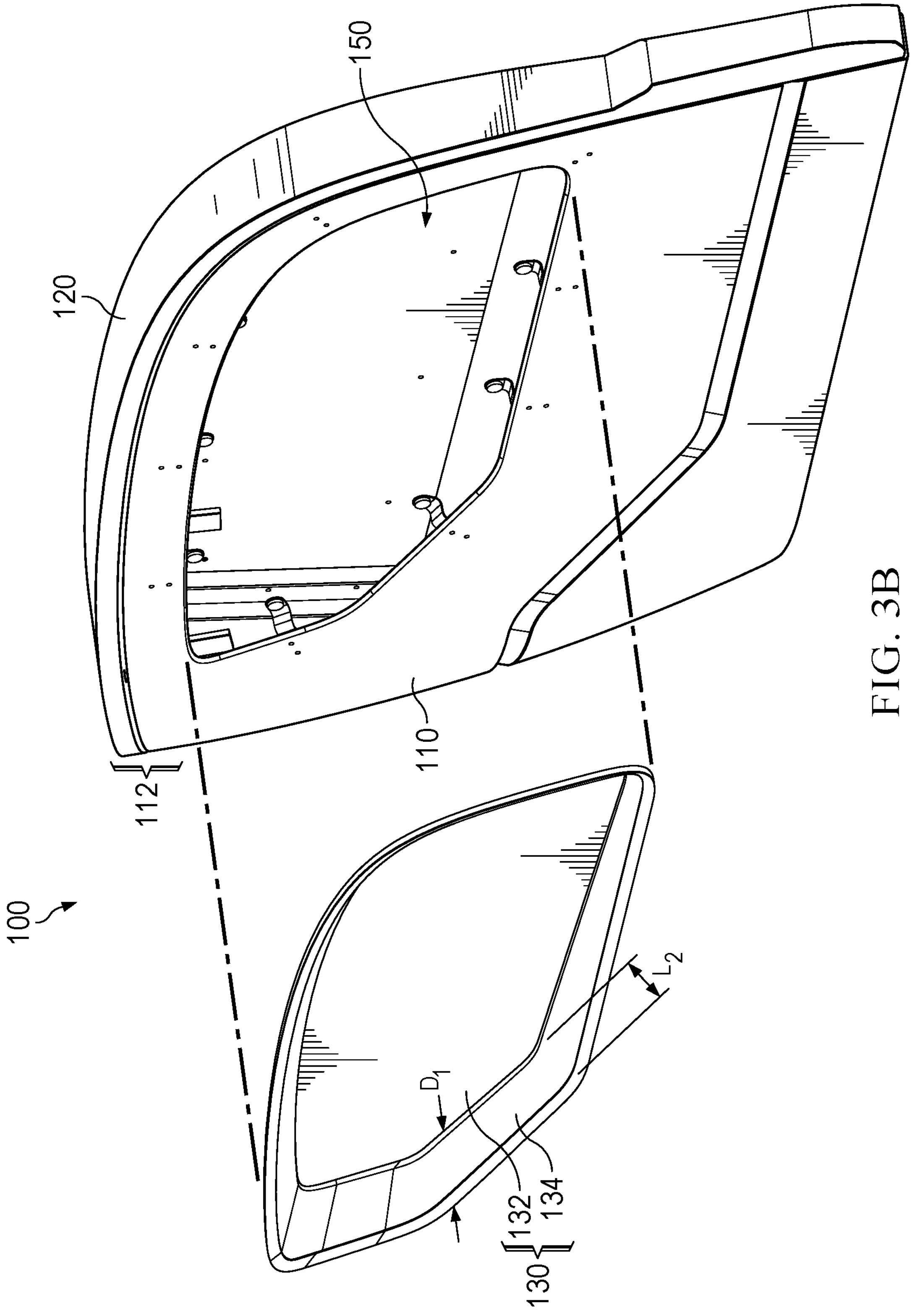

FIGS. 3A and 3B show isometric or perspective views of the inboard armrest assembly 100 from an exterior vantage. FIG. 3A shows the access panel 130 in the attached position within the side panel 110, and FIG. 3B shows the access panel 130 removed from the side panel 110 thereby exposing a portion of the inboard interior compartment 150. It should be appreciated that the recessed configuration of the access panel 130 from the side panel 110 contributes to an ergonomic shape or curvature of the armrest portion 112 of the inboard armrest assembly 100 allowing the passenger to grasp the passenger seat 10 for additional stability while in the passenger seat 10 or nearby. As discussed above, the walls of the bezel rim 134 may be concave or convex, and being moderately convex (see FIGS. 4A through 4C) may contribute to the ergonomic curvature of the armrest portion 112.

Moreover, this ergonomic feature is present along the armrest cap 120 at locations adjacent to the bezeled access panel 130, which includes the armrest portion 112 as well as forward portions of the armrest cap 120 and the side panel 110. As such, a depth of the access panel 130 (e.g., a depth $D_1$ and slope of the walls of the bezel rim 134) has a beneficial effect on the ergonomic design by providing additional curvature in the armrest portion 112 for grasp by a passenger. In addition, the bezel may have concave, convex, or straight walls based on improving the ergonomic benefit.

In some embodiments, the access panel 130 may have a constant depth and a constant slope around a circumference of the bezel rim 134, such that the walls of the bezel rim 134 have a substantially constant depth $D_1$ and a substantially constant length $L_2$. For example, the depth $D_1$ of the bezel rim 134 may range from 0.5 inches to 1.5 inches, such as being between 0.7 inches and 0.8 inches or about 1 inch. In addition, the slope of the bezel rim 134 may range from 20 degrees to 70 degrees. Further, the length $L_2$ of the walls around the bezel rim 134 may range from 0.7 inches to 2 inches (e.g., depending on the corresponding depth and slope), such as being between 0.8 inches and 1.7 inches. It should be appreciated that the portions with the greater lengths $L_2$ pertain to a flatter slope (e.g., around 20 degrees), and the portions with the lesser lengths $L_2$ pertain to a steeper slope (e.g., around 70 degrees).

In other embodiments, the access panel 130 may have a varying depth and/or varying slope around a circumference of the bezel rim 134, such that the walls of the bezel rim 134 have a varying depth $D_1$, a varying slope, and/or a varying length $L_2$. While varying around the circumference, these dimensions may remain within the ranges described above. For example, an upper portion (e.g., including a forward portion) of the bezel rim 134 adjacent to the armrest portion 112 of the inboard armrest assembly 100 may have a greater depth $D_1$ and/or a greater slope (e.g., implying a lesser length $L_2$) as compared to those dimensions at a lower portion (e.g., including an aft portion) of the bezel rim 134 distal from the armrest portion 112 and more proximal to the cabin floor. These varying depths $D_1$, slopes, and/or lengths $L_2$ of the bezel rim 134 may be graduated there-between.

In some embodiments, a greater depth $D_1$, a greater slope, and a lesser length $L_2$ in the upper portion (e.g., including the forward portion) of the bezel rim 134 may contribute to the ergonomic benefits of the armrest portion 112 described above. In addition, a lesser depth $D_1$, a lesser slope, and a greater length $L_2$ in the lower portion (e.g., including the aft portion) of the bezel rim 134 may allow for more space within the inboard interior compartment 150 (e.g., as discussed above, may be used to house various electronics, electrical features, or otherwise utilized by the passenger seat 10). However, various portions of the bezel rim 134 may differ with respect to these dimensions to provide ergonomic or spatial benefit to the passenger seat 10 (e.g., the inboard armrest assembly 100) or for other suitable reasons. For example, the upper portion (e.g., including the forward portion) of the bezel rim 134 may be steeper in order to improve the gripping ability of the armrest portion 112. Conversely, the upper portion of the bezel rim 134 may be flatter in order to give the armrest portion 112 a gentler ergonomic feel.

Figure 4A:
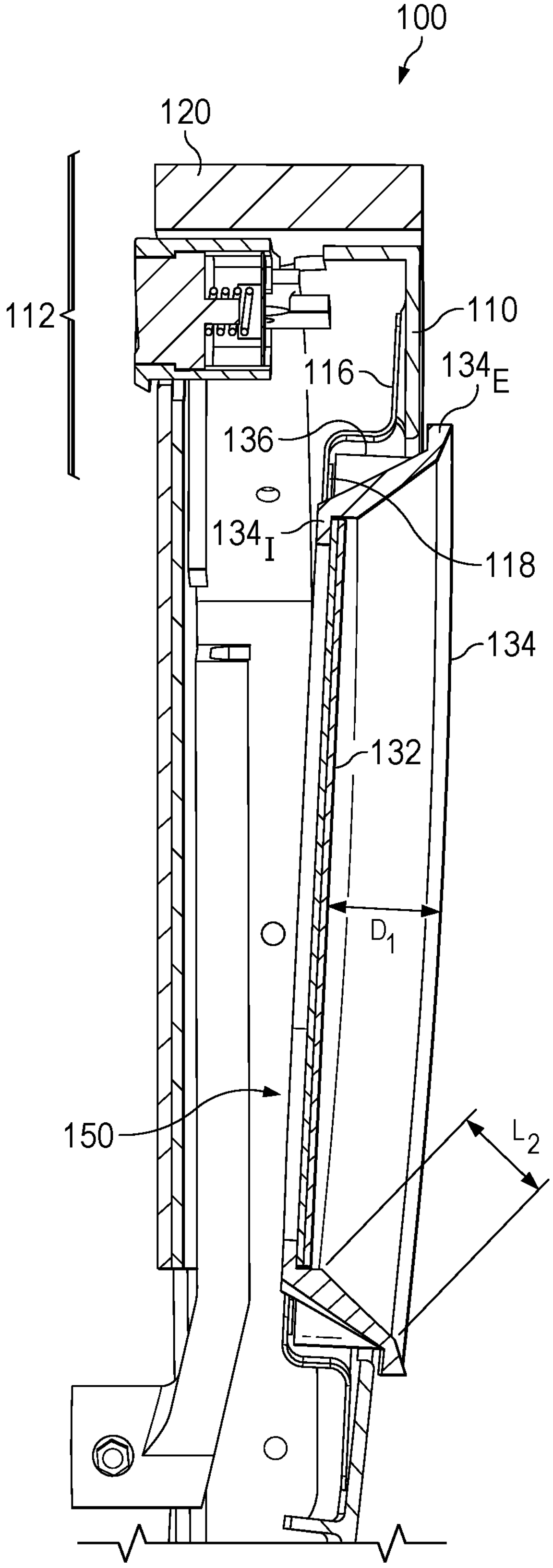
FIGS. 4A through 4C show section views of an inboard armrest assembly of a passenger seat, in accordance with various embodiments.
Figure 4B:
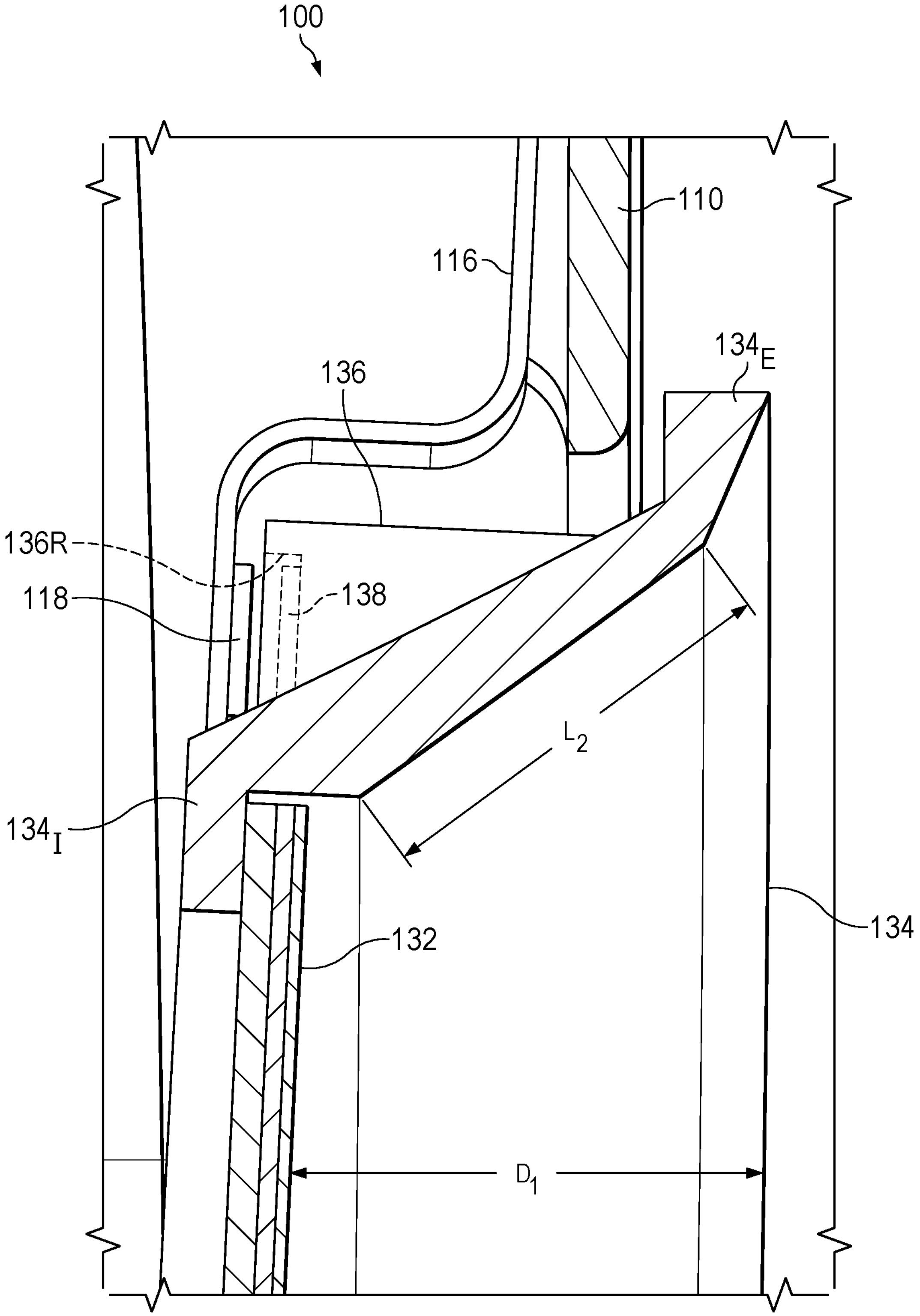
Figure 4C:
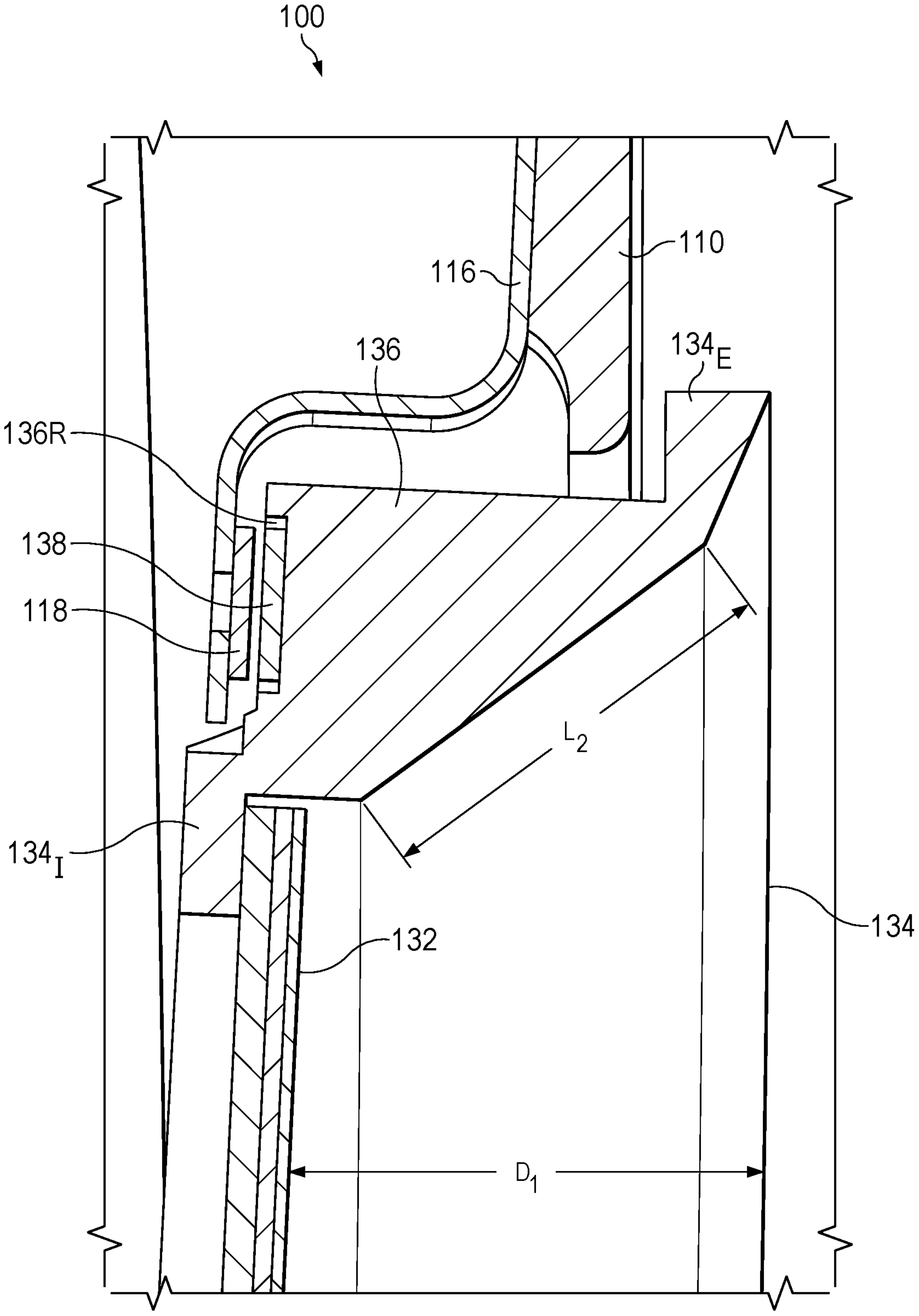

FIGS. 4A through 4C show section views of the inboard armrest assembly 100 to depict the removably attached position of the access panel 130 with the side panel 110, in accordance with some embodiments. In particular, the access panel 130 is held in place using magnets attached to the access panel 130, the side panel 110, or both the access panel 130 and the side panel 110, wherein corresponding magnets on each component are attracted to one another, or to another magnetic (e.g., ferromagnetic) surface or component, as the access panel 130 is placed and maintained in the removably attached position. As illustrated, side panel magnet supports 116 are attached to an interior of the side panel 110, and the side panel magnet supports 116 are used to hold side panel magnets 118. Similarly, access panel magnet supports 136 are attached to an interior of the access panel 130, and the access panel magnet supports 136 are used to hold access panel magnets 138. As discussed in greater detail below, the side panel magnets 118 and the access panel magnets together hold the access panel 130 in the removably attached position. FIGS. 4B and 4C provide closer views of these features, in accordance with various embodiments.

In some embodiments, each side panel magnet 118 (e.g., and side panel magnet support 116) aligns with a corresponding access panel magnet 138 (e.g., and corresponding access panel magnet support 136) when the access panel 130 is in the removably attached position with the side panel 110. The side panel magnet 118 and the access panel magnet 138 have a north-to-south (or south-to-north) orientation in order to maintain an attractive force when the access panel 130 is inset within the side panel 110 in the correct removably attached position. As discussed in greater detail below, any suitable number, location, and strength of these magnetic counterparts may be utilized to for an attractive force sufficiently strong to secure the access panel 130 while also being sufficiently weak to remove the access panel 130 from the attached position within the side panel 110.

In accordance with various embodiments, magnet pairs (e.g., the access panel magnet 138 and corresponding side panel magnet 118) may be substantially evenly spaced around the circumference of the access panel 130. For example, the number of magnets along each component may range from 5 to 15, such as 9 or 10, and any suitable number may be used. In addition, the magnets may have a separation from one another by a distance ranging from 3 inches to 6 inches, such as between about 4 and 5 inches. The number of magnets and spacing may be selected based on the strength of attraction between each magnet pair, or vice versa. For example, these parameters may be selected in order for a pulling force of 1 to 2 pounds applied to a corner or edge of the access panel 130 to be able to separate the adjacent magnet pairs (as well as the proximal magnet pairs) in order to pull the access panel 130 away from the side panel 110. In an embodiment, each component includes 9 magnets separated from one another by about 4.5 inches. However, any suitable dimensions, layouts, and magnet strengths may be used. In particular, with all other relevant parameters of the access panel 130 being the same (e.g., circumference and general shape), a number of magnets of at most 15 (e.g., separated by distances of at least 3 inches) ensures that a manageable force may be used to remove the access panel 130. Conversely, a number of magnets of at least 5 (e.g., separated by distances of at most 6 inches) ensures a sufficiently secure attachment of the access panel 130.

As noted above, the side panel 110 may include magnets while the access panel 130 may be magnetic (e.g., ferromagnetic). For example, in some embodiments, the access panel magnets 138 may be omitted, and the access panel magnet supports 136 may be magnetic. In other embodiments, the access panel 130 may include magnets while the side panel 110 may be magnetic (e.g., ferromagnetic). For example, the side panel magnets 118 may be omitted, and the side panel magnet supports 116 themselves may be magnetic (e.g., ferromagnetic).

To access the inboard interior compartment 150, the access panel 130 may be removed from the attached position in a variety of ways, depending on the parameters regarding the magnet strength and configuration discussed above. For example, in various embodiments, a force of 1 to 2 pounds may be applied to a corner of the access panel 130 to pull the access panel 130 from the side panel 110. In addition, a lever or a tool that can be used as a lever (e.g., a flathead screwdriver), may be used to pry an edge of the access panel 130 away from the side panel 110. The access panel 130 may then be fully removed by hand. Similarly, fingertips or fingernails may provide sufficient force and leverage to pry an edge or multiple edges of the access panel 130 away from the side panel 110. However, any suitable methods may be utilized that avoid damaging the side panel 110 or the access panel 130.

In some embodiments, the side panel magnet 118 is securely attached to the corresponding side panel magnet support 116 using an adhesive (not specifically illustrated), such as a tape or glue, or by any suitable means. Similarly, the access panel magnet 138 may be securely attached to the access panel magnet support 136 using an adhesive (not specifically illustrated), such as a tape or glue, or any suitable means. In some illustrated embodiments, the side panel magnet support 116 is an S-shaped bracket which is secured to the interior of the side panel 110. However, the side panel magnet support 116 may be another type of double-bend bracket or a hooked bracket which is shaped to curve around the bowl shape of the access panel 130 in order to facilitate the alignment of the side panel magnets 118 with corresponding access panel magnets 138. However, other suitable designs may be utilized, such as those illustrated and discussed below in connection with FIGS. 5A and 5B.

As further illustrated, optionally, the bezel rim 134 may include an exterior lip $\mathbf{134}_E$ and/or an interior lip $\mathbf{134}_I$ (e.g., each extending outward from a bulk of the bezel rim 134), wherein the exterior lip $\mathbf{134}_E$ is adjacent to the exterior of the side panel 110 and the interior lip $\mathbf{134}_I$ is adjacent to the interior of the side panel 110 when the access panel 130 is in the removably attached position. The exterior lip $\mathbf{134}_E$ provides a place to apply leverage in order to pull the access panel 130 from the side panel 110 or to grip the access panel 130 when placing it within the side panel 110 in the correct removably attached position. In some embodiments, the exterior lip $\mathbf{134}_E$ may extend over the exterior of the side panel 110. In other embodiments (not specifically illustrated), the exterior lip $\mathbf{134}_E$ may be flush or substantially level with the exterior of the side panel 110 when in the removably attached position, albeit leaving a sufficient gap for a lever to pry the access panel 130 from the side panel 110. Further, as illustrated, the exterior lip 134E may have a flatter slope than the bulk of the bezel rim 134, such that the slope of the exterior lip 134E is less than 20 degrees (e.g., less than or equal to about 10 degrees). The interior lip $\mathbf{134}_I$ provides a place of attachment of the decorative panel 132 using an adhesive (not specifically illustrated) such as a tape or glue, screws (see FIG. 5B), or any suitable means.

Referring to FIGS. 4B and 4C, in some embodiments, the access panel magnet 138 is inset within a recess 136R (e.g., a groove) in the access panel magnet support 136 (e.g., the access panel magnet support 136 may be a housing for the access panel magnet 138). For example, the access panel magnet 138 may be inset within the recess 136R such that a surface of the access panel magnet 138 is also recessed below a surface of the access panel magnet support 136.

In FIG. 4B, in accordance with some embodiments, the access panel magnet 138 and the recess 136R are illustrated with dotted lines to indicate those features being hidden in this particular cross-section view. In the illustrated embodiment, the access panel magnet 138 is inset within the recess 136R below the surface of the access panel magnet support 136 to leave a sufficient remainder of the recess 136R to also house the access panel magnet 138 when the access panel 130 is in the removably attached position. As such, the side panel magnet 118 may fill the remainder of the recess 136R and make physical contact with the access panel magnet 138.

In FIG. 4C, in accordance with various embodiments, the access panel magnet 138 may be inset within the recess 136R such that a surface of the access panel magnet 138 is substantially level with the surface of the access panel magnet support 136. Note that the access panel magnet 138 is visible within the recess 136R because FIG. 4C illustrates a cross-section that cuts through the access panel magnet support 136. In some embodiments, the access panel magnet 138 may be substantially level with the housing of the access panel magnet support 136. In other embodiments, the access panel magnet 138 protrudes from the access panel magnet support 136, such as wherein the access panel magnet support 136 does not include the recess 136R.

Figure 5A:
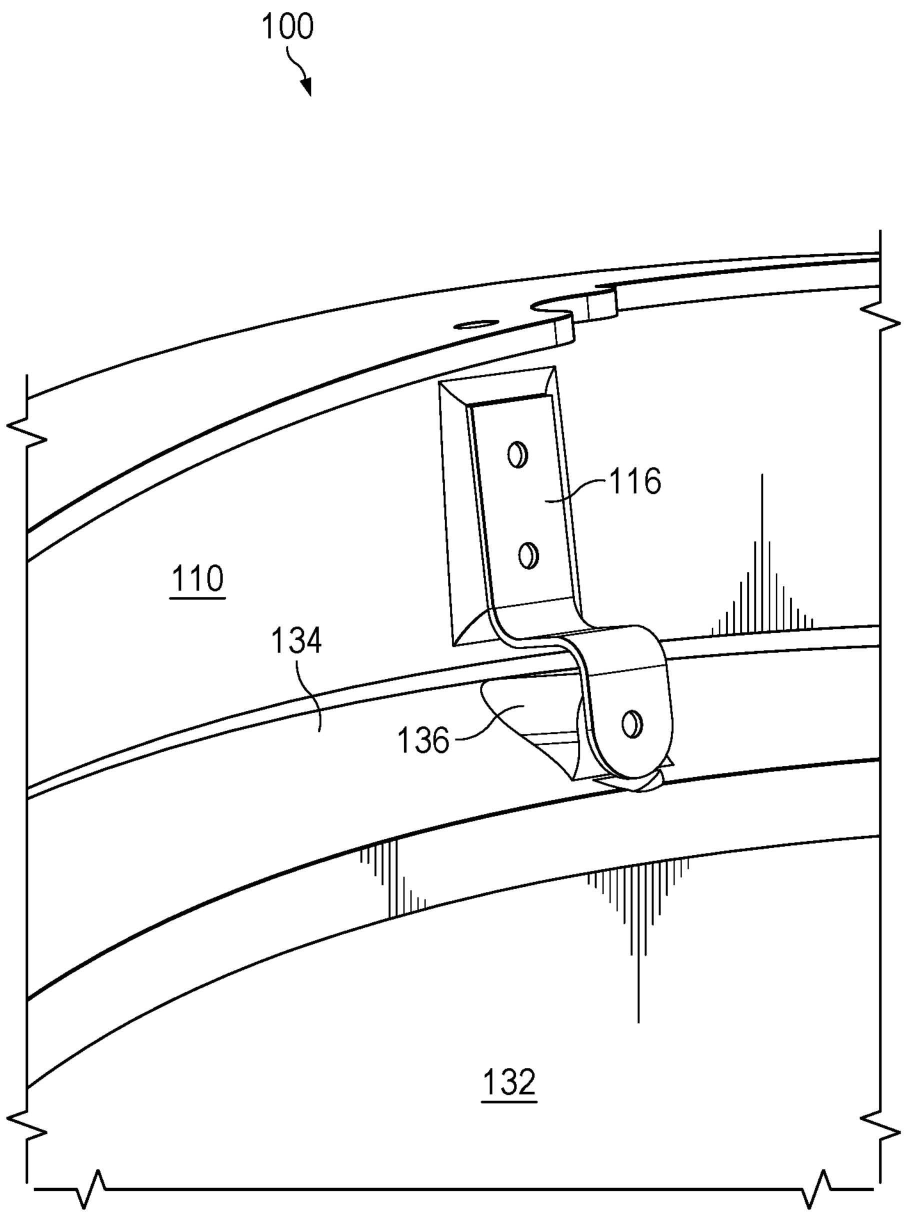
FIGS. 5A and 5B show close-up interior views of an inboard armrest assembly of a passenger seat, in accordance with various embodiments.
Figure 5B:
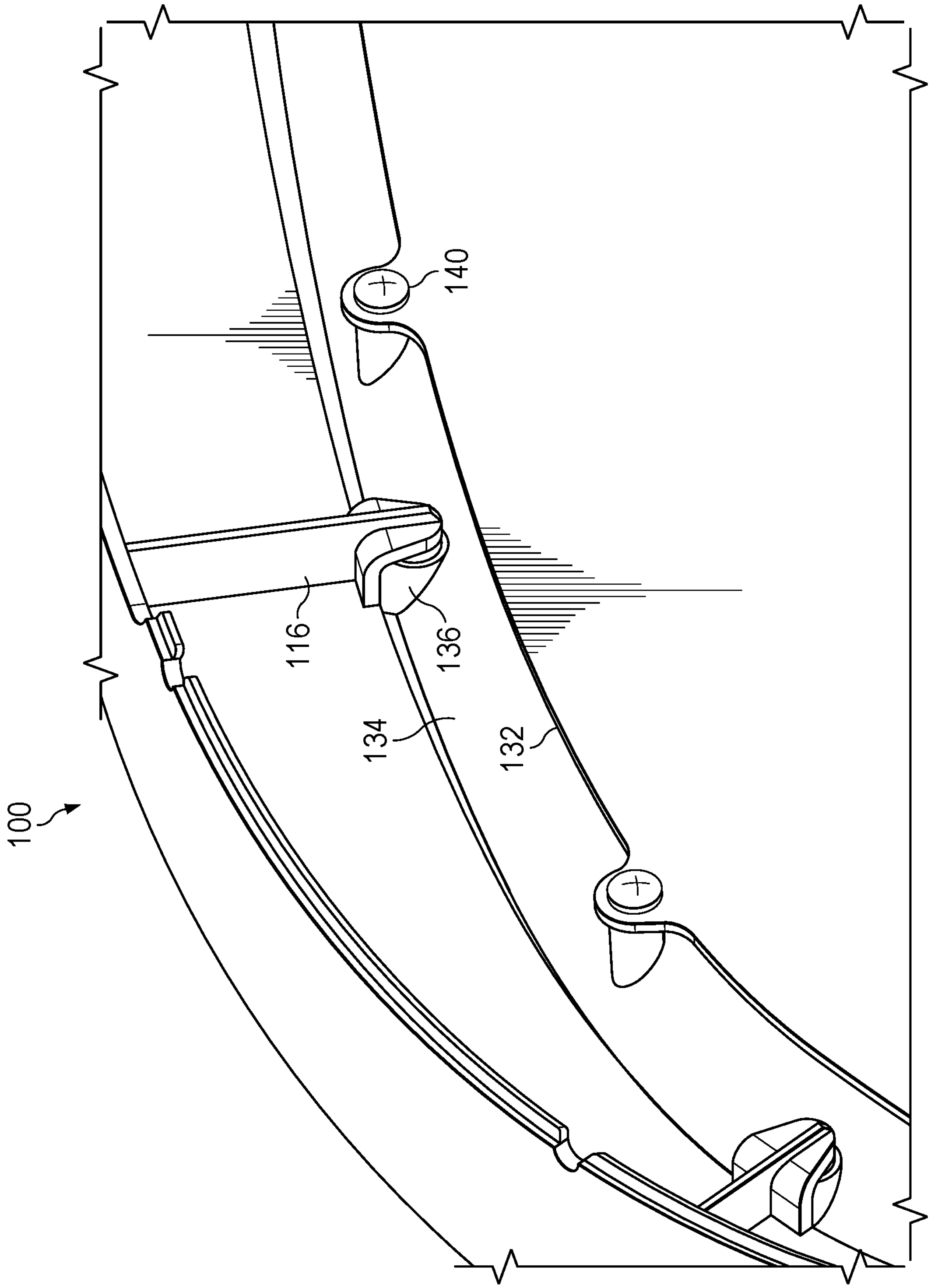

FIGS. 5A and 5B show embodiments of the side panel 110 and the access panel 130 from an interior vantage. Note that the features shown and described in FIGS. 5A and 5B may be interchanged with one another or interchanged with other embodiments shown and discussed above, as applicable. For example, FIG. 5A shows an isometric or perspective view of embodiments similar to the embodiments shown in FIGS. 4A through 4C. As discussed in greater detail below, FIG. 5B shows an isometric or perspective view of other embodiments for the side panel 110 and the access panel 130.

Referring to FIG. 5A, in some embodiments, the side panel magnet support 116 is a distinct component from the side panel 110. As noted above, the side panel magnet support 116 may be an S-shaped, double-bend, or hooked bracket secured to the interior of the side panel 110 such that the side panel magnet support 116 is hidden from view when the access panel 130 is in the removably attached position. For example, the side panel magnet support 116 may comprise a metal, such as aluminum, steel, copper, brass, nickel, tin, silver, and titanium (e.g., a sheet metal or a metal alloy), a plastic, a combination thereof, or any suitable material. In addition, the side panel magnet support 116 may be a same or different material as the side panel 110. The side panel magnet support 116 may be attached to the side panel 110 using screws, adhesives, or any suitable means. As discussed above, the side panel magnets 118 may be attached to the side panel magnet supports 116 with an adhesive or by any suitable means.

Referring to FIG. 5B, the side panel magnet support 116 may be a continuous portion of the side panel 110. For example, in embodiments in which the side panel 110 includes a plastic (e.g., an injection molded plastic), the side panel magnet support 116 may be formed (e.g., molded) with the rest of the side panel 110. As discussed above, the side panel magnets 118 may be attached to the side panel magnet supports 116 with an adhesive or by any suitable means.

As further illustrated, the decorative panel 132 of the access panel 130 may be attached to the bezel rim 134 using a plurality of screws 140. Contrasted with the embodiments described in connection with FIGS. 4A through 4C, FIG. 5B depicts the decorative panel 132 being attached along an outside of the bowl shape of the access panel 130 (e.g., outside of the walls of the bezel rim 134). However, in some embodiments, the decorative panel 132 is attached along an inside of the bowl shape of the access panel 130, which may be applicable to any embodiments described in connection with FIGS. 4A-5A.

Figure 6:
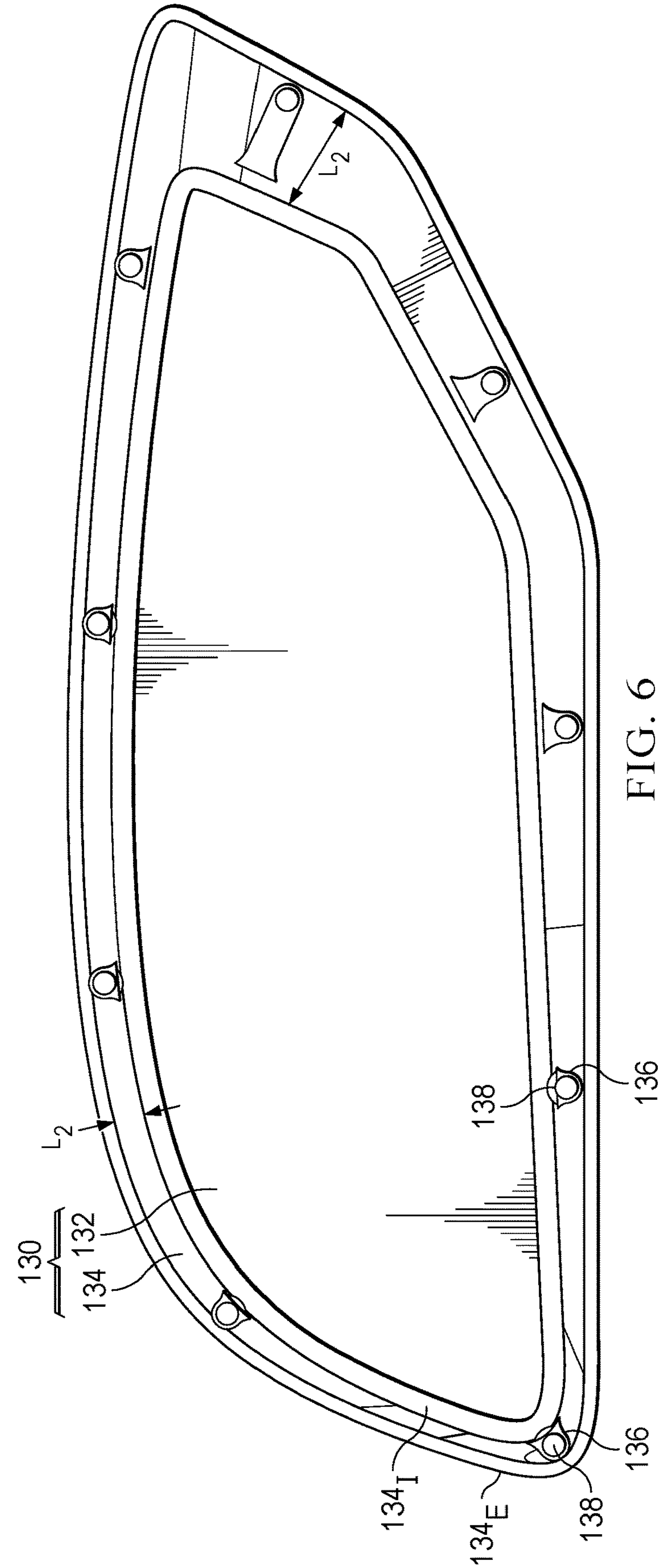
FIG. 6 shows an interior view of an access panel of an inboard armrest assembly, in accordance with various embodiments.

FIG. 6 shows an interior view of the access panel 130, in accordance with various embodiments. As illustrated, the access panel magnets 138 and access panel magnet supports 136 may be distributed around the bezel rim 134. In addition, the length $L_2$ (and depth $D_1$, although not specifically labeled in FIG. 6) may vary at different locations along the circumference of the bezel rim 134 as discussed above.

FIG. 7 shows the outboard side view of the passenger seat 10. Similarly as the inboard armrest assembly 100, the outboard armrest assembly 200 includes a side panel 210 (e.g., a primary panel), an armrest cap 220, an access panel 230 (e.g., an inset panel assembly), and an outboard interior compartment 250. Note that the outboard armrest assembly 200 includes features that may differ from the analogous features of the inboard armrest assembly 100, however, some of these features of the outboard armrest assembly 200 may be the same as or similar to those analogous features of the inboard armrest assembly 100 (where applicable) in addition or alternatively to the embodiments discussed in below. As illustrated, the side panel 210 provides a lateral outer casing or protective structure for the outboard side of the passenger seat 10. The side panel 210 may comprise one piece or multiple pieces made of plastic, metal (e.g., metal alloy), any other suitable materials, or combinations thereof. In addition, the armrest cap 220 extends over and along outer edges of the side panel 210 and may comprise a plastic or any sturdy material with a soft and flexible tactility. The armrest cap 220 provides a location for the passenger to rest or grasp onto the passenger seat 10 for comfort and/or stability. Furthermore, for the benefit of later discussion, the armrest cap 220 and an upper portion of the side panel 210 may collectively be referred to as an armrest portion 212 of the outboard armrest assembly 200.

In some embodiments, the access panel 230 may be an inset to a central region of the side panel 210. The access panel 230 provides a means to access the outboard interior compartment 250 in an efficient manner in lieu of dismantling portions of the passenger seat 10 (e.g., the outboard armrest assembly 200). As such, the access panel 230 is also removably attached to (e.g., attachable to and detachable from) the side panel 210 without otherwise altering the structure of other components of the outboard armrest assembly 200.

Figure 10:
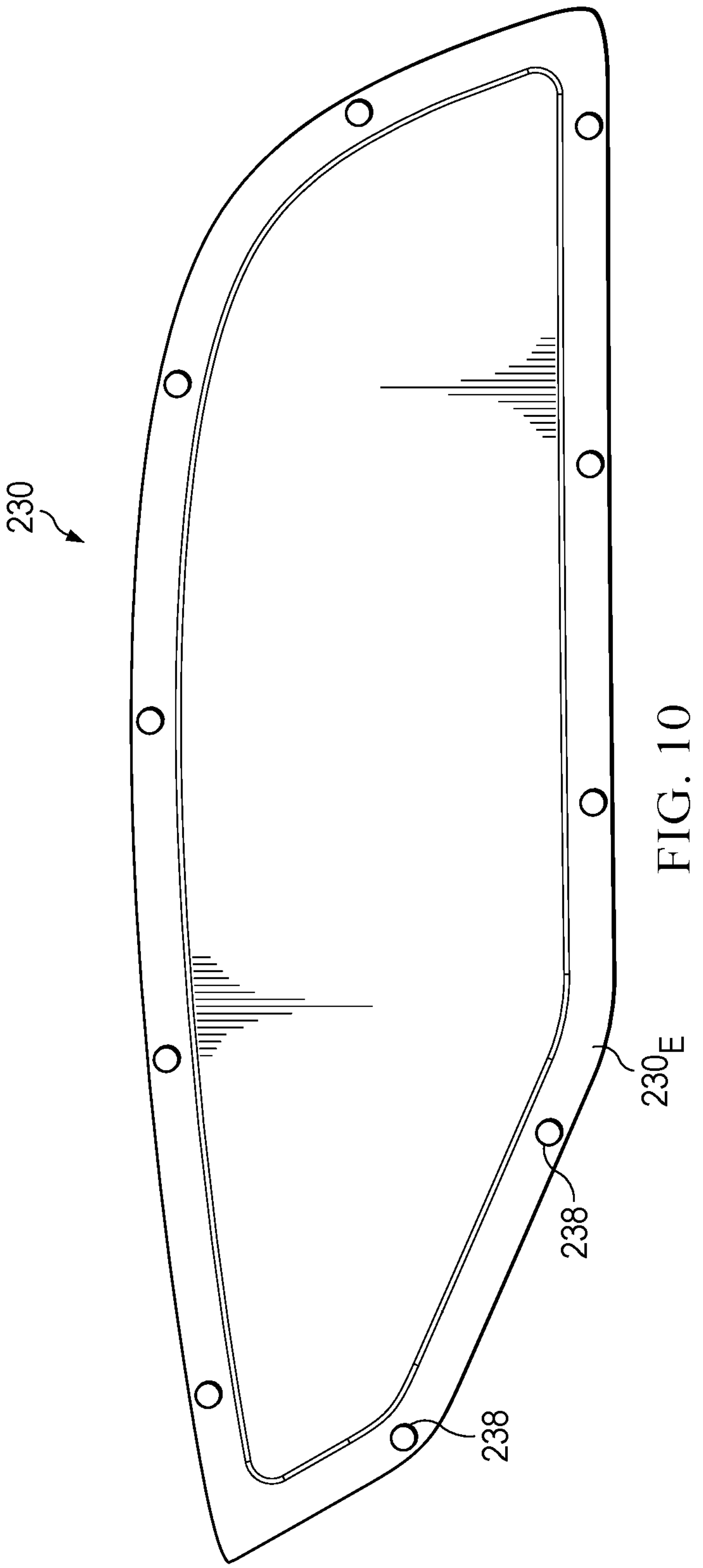
FIG. 10 shows an interior view of an access panel of an outboard armrest assembly, in accordance with various embodiments.

As illustrated, the access panel 230 may include a single decorative panel configured to attach to an interior rim of the side panel 210 (see FIG. 10). In addition, the outboard access panel 230 may have an exterior surface that is flush or substantially level with an exterior surface of the side panel 210 when the access panel 230 is placed in the removably attached position.

Similarly as with the access panel 130, in some embodiments, the access panel 230 has a shape that is concentric to and/or substantially follows the shapes of some outer edges of the side panel 210. For example, top and front edges of the access panel 230 may substantially follow top and front edges of the side panel 210. A height $H_3$ and a width $W_3$ of the side panel 210 above and around the access panel 230 edges may be greater than or equal to about 2 inches (although these dimensions may each be greater than or equal to 1 inch, similarly as with the inboard armrest assembly 100) for the benefit of structural integrity of side panel 210 of the outboard armrest assembly 200. However, the outer edge of the access panel 230 may be any suitable shape. In addition, the access panel 230 may have a height $H_4$ (e.g., a maximum vertical height) ranging from about 5 inches to about 8 inches (e.g., about 6 inches) and a length $L_3$ (e.g., a maximum horizontal length) ranging from about 8 inches to about 20 inches (e.g., about 18 inches). These dimensions are intended to be large enough for accessibility of the outboard interior compartment 250 (e.g., by hand or requisite tools) while also allowing other parts of the outboard armrest assembly 200 to provide sufficient structural stability. However, any suitable dimension ranges and shapes of the access panel 230 may be used, which may be substantially the same or different from analogous dimensions of the access panel 130.

The side panel 210 may include the same material(s) as the side panel 110, and the access panel 230 may also include the same material(s). In various embodiments (not separately illustrated), the side panel 210 is wrapped in a fabric or other textile material, including a cotton, a leather, a leather-like material, other natural or other polysynthetic fabrics, or the like. The armrest cap 220 may include a covering (not specifically illustrated but similar to the covering 122), such as a foam material, a fabric, and/or other cover material that is a same, similar, or different as the wrapping around the side panel 210. In other embodiments, the armrest cap 220 remains bare and comprises a foam material, a plastic, or another sturdy material, which may be rigid or have a soft and flexible tactility. As such, the wrapping around the side panel 210 may be attached to the side panel 210 and tucked under the armrest cap 220. In accordance with various embodiments, the wrappings (or lack thereof) for the side panel 210 and the armrest cap 220 may be the same as the respective wrappings (or lack thereof) for the side panel 110 and the armrest cap 120. Further, the access panel 230 may be wrapped in a same fabric or other textile material as used for the side panel 210. As such, the respective wrappings may be flush or substantially level when the access panel 230 is in the removably attached position.

Figure 8A:
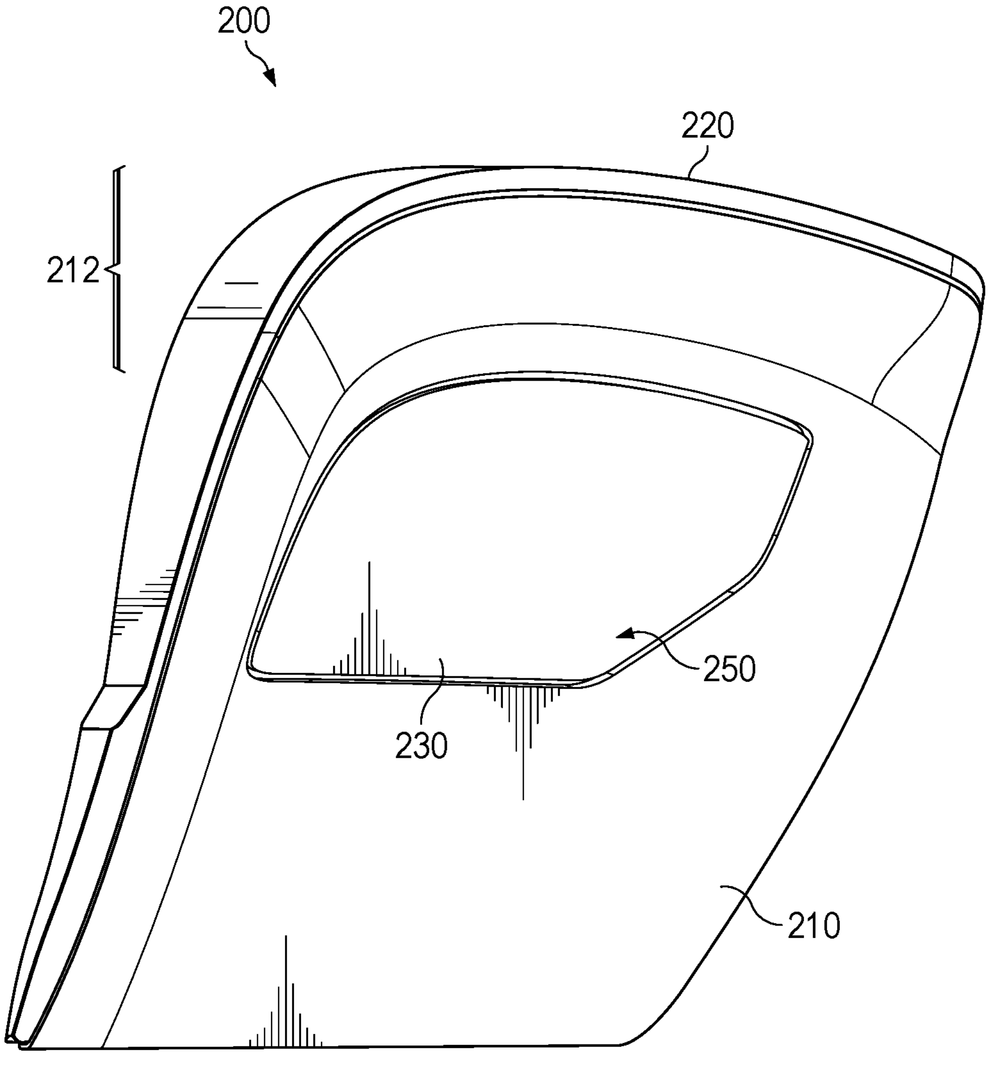
FIGS. 8A and 8B show an outboard armrest assembly of a passenger seat, in accordance with various embodiments.
Figure 8B:
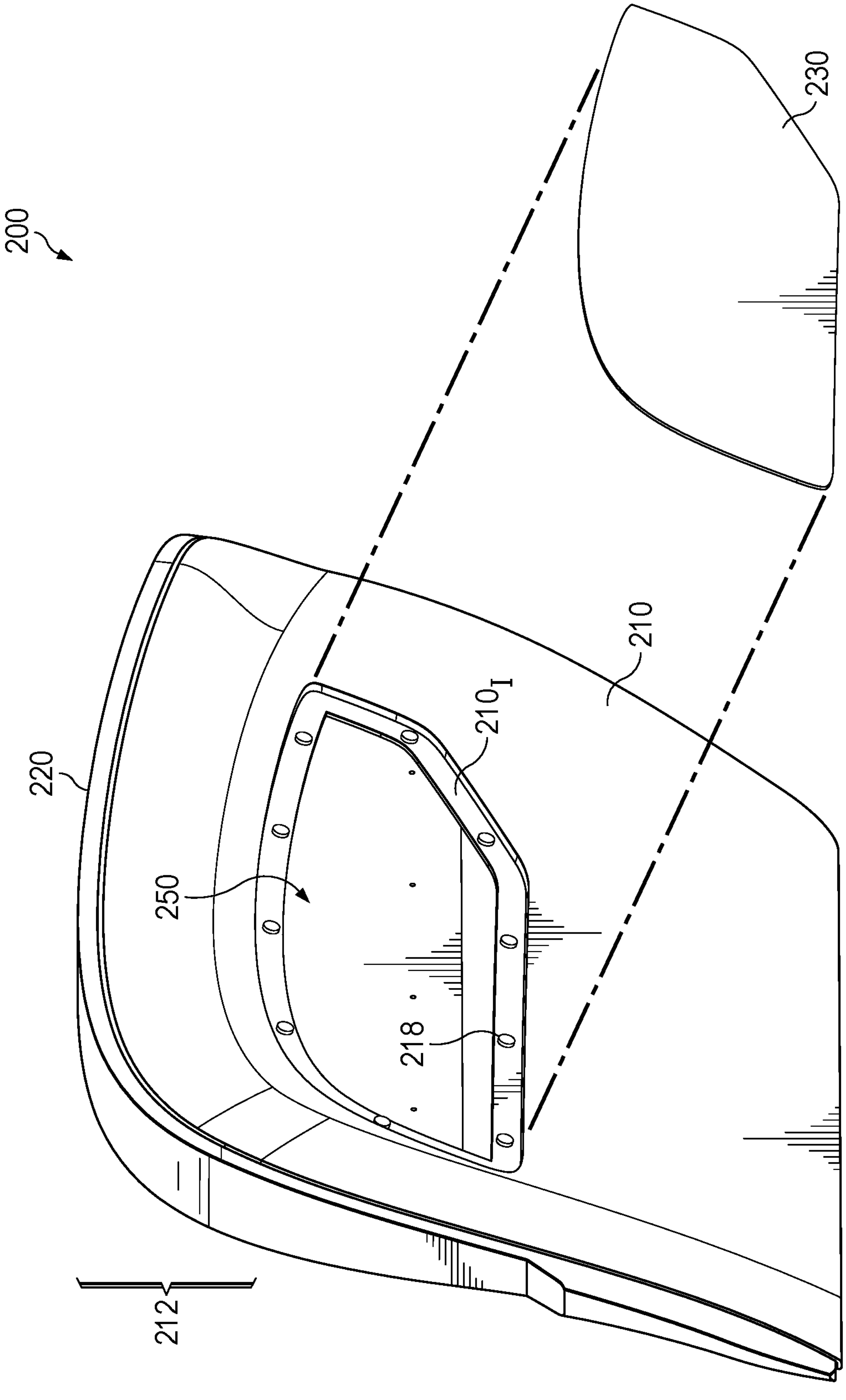

FIGS. 8A and 8B show isometric or perspective views of the outboard armrest assembly 200 from an exterior vantage. FIG. 8A shows the access panel 230 in the attached position within the side panel 210, and FIG. 8B shows the access panel 230 removed from the side panel 210 thereby exposing a portion of the outboard interior compartment 250. As discussed above, the exterior of the access panel 230 may follow the contours of the exterior surface of the side panel 210. For example, the access panel 230 may lack a bezel rim, thereby differing from the access panel 130 in that regard. As such, the access panel 230 may have less contribution to ergonomic features relating to the armrest portion 212 of the outboard armrest assembly 200 (e.g., as compared to an analogous contribution by the access panel 130). However, the contours of the exterior surface of the side panel 210 that are part of the armrest portion 212 may contribute to such ergonomic features.

Figure 9:
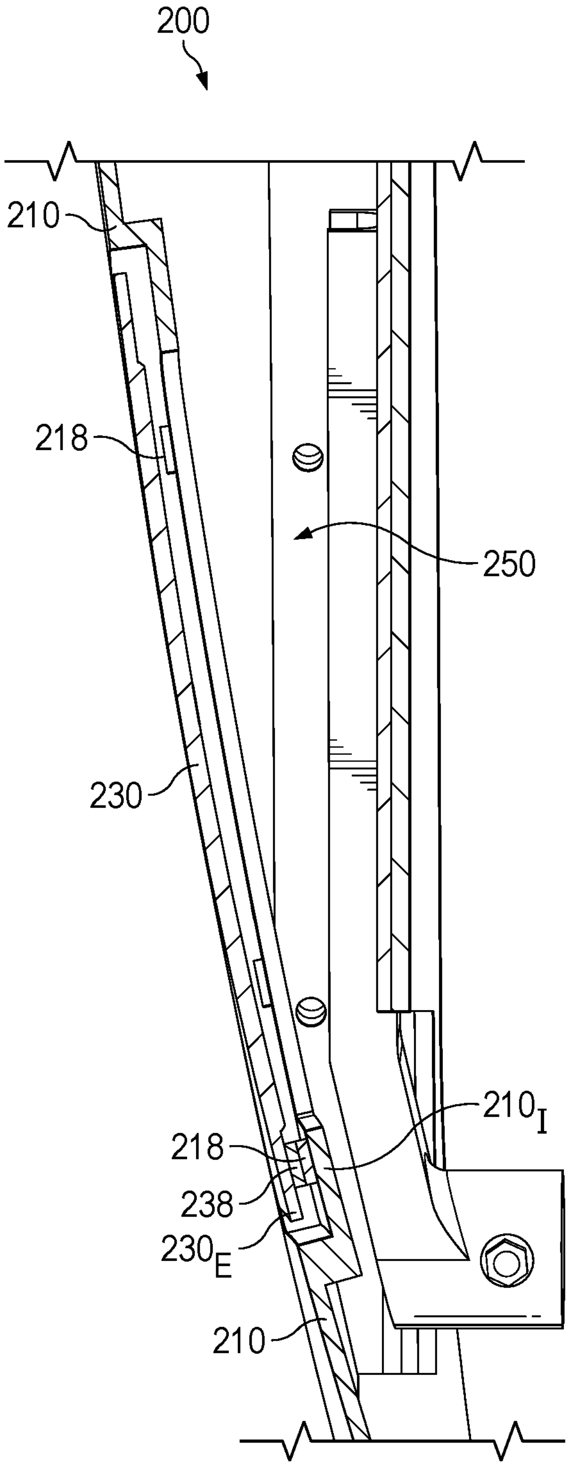
FIG. 9 shows a section view of an outboard armrest assembly of a passenger seat, in accordance with various embodiments.

FIG. 9 shows a section view of the outboard armrest assembly 200 to depict the removably attached position of the access panel 230 with the side panel 210, in accordance with some embodiments. In particular, the access panel 230 is held in place using magnets attached to the access panel 230 and the side panel 210, wherein corresponding magnets on each component are attracted to one another as the access panel 230 is placed and maintained in the removably attached position. In some embodiments, side panel magnets 218 are secured directly to the side panel 210 and access panel magnets 238 are secured directly to an interior of the access panel 230. As such, each component may not require magnet supports, however, any suitable attachment mechanism or components may be utilized.

Each side panel magnet 218 aligns with a corresponding access panel magnet 238 when the access panel 230 is in the removably attached position with the side panel 210. The side panel magnet 218 and the access panel magnet 238 have a north-to-south (or south-to-north) orientation in order to maintain an attractive force when the access panel 230 is inset within the side panel 210 in the correct removably attached position. As discussed in greater detail below, any suitable number, location, and strength of these magnetic counterparts may be utilized to for an attractive force sufficiently strong to secure the access panel 230 while also being sufficiently weak to remove the access panel 230 from the attached position.

In accordance with various embodiments, magnet pairs (e.g., the access panel magnet 238 and corresponding side panel magnet 218) may be substantially evenly spaced around the circumference of the access panel 230. For example, the strengths of each magnet pair, the number of magnet pairs, and the locations of the magnet pairs for the outboard armrest assembly 200 may be substantially the same or analogous to magnet pairs described in connection with the inboard armrest assembly 100. In some embodiments, some of these parameters may be chosen to give the access panel 230 a stronger attachment than the access panel 130, albeit within the ranges described above. In other embodiments, some of these parameters may be chosen to give the access panel 230 a weaker attachment than the access panel 130, albeit within the ranges described above. However, any suitable dimensions, layouts, and magnet strengths may be used.

The access panel 230 may be removed from the attached position in a variety of ways, depending on the strength and configuration of attachment and based on the parameters discussed above. For example, a lever or a tool that can be used as a lever (e.g., a flathead screwdriver) may be used to pry an edge of the access panel 230 away from the side panel 210. The access panel 230 may then be fully removed by hand. Similarly, fingertips or fingernails may provide sufficient force or leverage to pry an edge or multiple edges of the access panel 230 away from the side panel 210. However, any suitable methods may be utilized that avoid damaging the side panel 210 or the access panel 230.

As further illustrated, the side panel 210 may include an interior lip $\mathbf{210}_I$ which provides a structure to attach the side panel magnets 218 and for the access panel 230 to be secured against. As illustrated, the interior lip $\mathbf{210}_I$ may give the side panel 210 an S-shape, a curved shape, or a hooked shape in order to achieve analogous objectives as the side panel magnet supports 116 of the side panel 110. In some embodiments, a depth of the interior lip $\mathbf{210}_I$ is substantially the same as the sum of the thicknesses of the access panel 230, the access panel magnets 238, and the side panel magnets 218 in order for the exteriors of the side panel 210 and the access panel 230 to be flush or substantially level. The side panel magnets 218 may be securely attached to the side panel 210 (e.g., to the interior lip $\mathbf{210}_I$) using an adhesive (not specifically illustrated), such as a tape or glue, or by any suitable means. Similarly, the access panel magnet 238 may be securely attached to the interior of the access panel 230 using an adhesive (not specifically illustrated), such as a tape or glue, or any suitable means. In other embodiments (not specifically illustrated), side panel magnet supports (e.g., similar to the side panel magnet supports 116) may be utilized to hold the side panel magnets 218 (see FIGS. 4A-5B). However, due to the access panel 230 having less depth than the access panel 130, the side panel magnet supports for the side panel 210 would also have less depth than the side panel magnet supports 116.

As further illustrated, in some embodiments, an interior of the access panel 230 is recessed such that the access panel 230 has an exterior lip $\mathbf{230}_E$ along a circumference of the access panel 230. The exterior lip $\mathbf{230}_E$ provides a place to apply leverage in order to pull the access panel 230 from the side panel 210 or to grip the access panel 230 when placing it within the side panel 210 in the correct removably attached position. In some embodiments, the side panel magnets 218 are attached the interior lip $\mathbf{210}_I$ and the access panel magnets are attached to the exterior lip $\mathbf{230}_E$. In addition, the exterior lip $\mathbf{230}_E$ may extend over the exterior of the side panel 210, such that the exterior lip $\mathbf{230}_E$ overlaps the interior lip $\mathbf{210}_I$. Further, an exterior of the access panel 230 to be flush or substantially level with the exterior of the side panel 210 when in the removably attached position, albeit leaving a sufficient gap for a lever to pry the access panel 230 from the side panel 210.

FIG. 10 shows an interior view of the access panel 230, in accordance with various embodiments. As illustrated, the exterior lip $\mathbf{230}_E$ may extend along a circumference of the access panel 230. In addition, the access panel magnets 238 may be distributed along the exterior lip $\mathbf{230}_E$.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A passenger seat comprising:
a first armrest assembly;
a second armrest assembly, the second armrest assembly comprising:
a side panel comprising an armrest portion and a side portion, the side panel comprising a first magnet secured on an interior side of the side panel;
an interior compartment disposed within the side panel; and
an access panel in a removably attached position to the side panel, the access panel comprising a second magnet secured on an interior side of the access panel, the first magnet being aligned with the second magnet when the access panel is in the removably attached position, wherein the access panel comprises a bezel rim.

2. The passenger seat of claim 1, wherein the access panel comprises a decorative panel, wherein the decorative panel is inset from an exterior side of the side panel when the access panel is in the removably attached position, and wherein the exterior side of the side panel is opposite the interior side of the side panel.

3. The passenger seat of claim 2, wherein the bezel rim has a same width throughout.

4. The passenger seat of claim 2, wherein the bezel rim has a greater depth in an upper portion than in a lower portion, wherein the upper portion is proximal to the armrest portion and the lower portion is distal from the armrest portion when the access panel is in the removably attached position.

5. The passenger seat of claim 2, wherein the side panel comprises a first magnet support securing the first magnet to a major component of the side panel, and wherein the access panel comprises a second magnet support securing the second magnet to the bezel rim.

6. The passenger seat of claim 5, wherein the first magnet support is a metal S-shaped bracket.

7. The passenger seat of claim 5, wherein the first magnet support is a continuous material with the major component of the side panel.

8. An armrest assembly of a passenger seat, the armrest assembly comprising:
a primary side panel comprising:
an exterior face, the exterior face being exterior to the passenger seat;
an interior face, the interior face being interior to the passenger seat;
a looped opening extending from the exterior face to the interior face;
a side panel magnet support along the interior face; and
a side panel magnet attached to the side panel magnet support; and
an access panel within the looped opening of the primary side panel, the access panel comprising:
a looped rim extending through the looped opening of the primary side panel;
a decorative panel attached to the looped rim; and
a magnetic component along an outer wall of the looped rim.

9. The armrest assembly of claim 8, wherein the magnetic component comprises a ferromagnetic material.

10. The armrest assembly of claim 8, wherein the magnetic component comprises:

an access panel magnet support attached to the looped rim; and an access panel magnet attached to the access panel magnet support.

11. The armrest assembly of claim 8, wherein a location of the side panel magnet support in relation to the looped opening corresponds to a location of the magnetic component in relation to the looped rim.

12. The armrest assembly of claim 8, wherein a first shape of an outer edge of the decorative panel is the same as a second shape of an outer edge of the looped rim.

13. The armrest assembly of claim 12, wherein the first shape is smaller than the second shape.

14. The armrest assembly of claim 13, wherein an inner edge of the looped opening has a third shape, and wherein the third shape is larger than the first shape and smaller than the second shape.

15. A passenger seat, comprising:

a seat;

a first armrest assembly on a first side of the seat, the first armrest assembly comprising:

a first side panel, the first side panel comprising a first looped opening, the first looped opening exposing a first interior region; and a first access panel having a substantially same first shape as the first looped opening, the first access panel being secured to the first side panel with a first magnetic attraction, the first access panel further comprising a bowl shape;

a second armrest assembly on a second side of the seat, the second armrest assembly comprising:

a second side panel, the second side panel comprising a second looped opening, the second looped opening exposing a second interior region; and a second access panel having a substantially same second shape as the second looped opening, the second access panel being secured to the second side panel with a second magnetic attraction.

16. The passenger seat of claim 15, wherein the first access panel has a first depth, wherein the second access panel has a second depth, and wherein the first depth is greater than the second depth.

17. The passenger seat of claim 15, wherein the first magnetic attraction comprises:

a magnet of the first side panel; and a magnetic material of the first access panel.

18. The passenger seat of claim 17, wherein the magnetic material comprises an additional magnet.

19. The passenger seat of claim 15, wherein a first shape of the first access panel is a mirror image of a second shape of the second access panel.

20. The passenger seat of claim 15, wherein the bowl shape extends into the first armrest assembly when the first access panel is secured to the first side panel.

* * * * *